(12) United States Patent
Jeong

(10) Patent No.: US 6,894,730 B2
(45) Date of Patent: May 17, 2005

(54) STRUCTURE OF PROJECTION TELEVISION AND PRODUCING METHOD THEREOF

(75) Inventor: Dong Seon Jeong, Daegu-si (KR)

(73) Assignee: LG Electronics Inc., Seoul (KR)

(*) Notice: Subject to any disclaimer, the term of this patent is extended or adjusted under 35 U.S.C. 154(b) by 70 days.

(21) Appl. No.: 10/255,636

(22) Filed: Sep. 27, 2002

(65) Prior Publication Data

US 2003/0122473 A1 Jul. 3, 2003

(30) Foreign Application Priority Data

Dec. 29, 2001 (KR) .................................. 2001-0087963

(51) Int. Cl.⁷ ................................................ H04N 5/64
(52) U.S. Cl. ...................... 348/787; 348/789; 312/7.2; D14/128
(58) Field of Search ................................ 348/787, 789; 312/7.2, 223.2; 313/461, 476; D16/230; D14/128, 374, 451, 133

(56) References Cited

U.S. PATENT DOCUMENTS

| | | | | |
|---|---|---|---|---|
| D353,586 S | * | 12/1994 | Renk | D14/126 |
| 6,039,912 A | * | 3/2000 | Ohira et al. | 264/328.1 |
| D434,015 S | * | 11/2000 | Oe et al. | D14/128 |
| 6,157,416 A | * | 12/2000 | Whitelaw et al. | 348/789 |
| 6,545,729 B1 | * | 4/2003 | Lowe | 348/836 |
| 6,709,114 B1 | * | 3/2004 | Duggan et al. | 353/74 |

* cited by examiner

Primary Examiner—Victor R. Kostak
(74) Attorney, Agent, or Firm—Fleshner & Kim, LLP

(57) ABSTRACT

Disclosed is a structure of a projection television comprising a screen, a front panel, a supporting part upon which an image forming device is mounted, an one-piece cabinet having an upper opening for the screen and a lower opening for the front panel, and upper and lower back covers provided at the rear of the one-piece cabinet.

15 Claims, 14 Drawing Sheets

US 6,894,730 B2

STRUCTURE OF PROJECTION TELEVISION AND PRODUCING METHOD THEREOF

BACKGROUND OF THE INVENTION

1. Field of the Invention

The present invention relates to a projection television, and more particularly to a structure of a projection television which can be constructed in a more convenient and stable way to have an improved appearance, and a method for manufacturing the structure.

2. Description of the Related Art

Recently, consumers increasingly demands a larger screen of a television and thus, use of a projection television applying a projector rapidly increases.

Meanwhile, a television applying a cathode ray tube or a liquid crystal display which has been widely and largely used in conventional image display devices, now faces a limiting situation for its size. Since production cost increases at the ratio of geometrical progression as the screen is bigger, there is a limit to satisfy demands of consumers for a big screen. Accordingly, the projection television is in the spotlight as a substitution to solve the above problems.

The projection television can be formed to have a big screen and thus can be set in a public place so that many people can watch the television. Also, since the projection television applies the direct light incident to a screen for displaying images, it has an advantage in that fatigue of eyes can be alleviated.

FIG. 1 is a perspective view of the conventional projection television.

Referring to FIG. 1, the projection television comprises a screen 1 upon which lights projected from a projector form an image, an upper cabinet 5 disposed outside the screen 1 to support the screen 1, a front panel 15 disposed under the screen 1 and provided with a image control device, a lower cabinet 10 formed on the circumference of the front panel 15 to support the front panel 15, an upper back cover 20 disposed at the rear part of the upper cabinet 5 to protect interior components and having a mirror mounted therein to reflect images projected from the projector, and a lower back cover 25 provided under the back cover 20 to protect the apparatus.

A supporting part 30 (FIG. 2) for supporting the projector is further provided between the lower cabinet 10 and the lower back cover 25.

Briefly explaining the operation of the projection television referring to the configuration of the projection television shown in FIG. 1, an image projected from the projector reaches the mirror, upon which the image is reflected toward the screen 1 to form the image thereon.

FIG. 2 is an exploded perspective view of the conventional projection television.

Referring to FIG. 2, a screen 1 upon which an image is formed is provided and fixed to the inner circumference of an upper cabinet 5. An upper back cover 20 is provided at the rear of the upper cabinet 5. The upper back cover 20 has a mirror 21 mounted therein to reflect lights projected from a projector to form images on the screen 1.

A lower cabinet 10 is provided under the upper cabinet 5, which is bound by a binding means such as a screw to the upper cabinet 5. In front of the lower cabinet 10, a front panel 15 is fixed. In the rear of the lower cabinet 10, a supporting part 30 is provided as a base having a heavy weight to support the projector to be mounted thereon. In the rear of the supporting part 30, a lower back cover 25 is provided to protect numerous components installed inside of the projection television.

In the supporting part 30, in addition to the projector, a plurality of circuit boards (not shown) to drive the projector is installed and connected to a control device provided at the rear surface of the upper panel 15 to operate the projection television.

The upper cabinet 5 and the lower cabinet are fixed with each other by a designated binding structure in such a fashion that the lower surface of the upper cabinet 5 is fixed to the upper surface of the lower cabinet 10.

More specifically, the lower surface of the upper cabinet 5 and the upper surface of the lower cabinet 10 are fixed to each other by inserting screws at least two points through the contacting surfaces, or by a designated engaging structure.

However, as described above, in the conventional projection television, since the upper cabinet 5 and the lower cabinet 10 are fixed to each other by separate components, the upper cabinet 5 mounted at the upper part is weak to an external impact and tends to shake upon a small vibration.

Also, a binding line is formed in a joint surface upon which the upper cabinet 5 and the lower cabinet 10 are fixed, thereby deteriorating the appearance of the projection television.

Further, much efforts and troubles should be taken to align the upper cabinet 5 and the lower cabinet 10 upward and downward in order to bind the upper cabinet 5 and the lower cabinet 10 in a condition that the two cabinets exactly accord with each other.

In order to solve both of the problems associated with the exterior vibration and the appearance of the television, it has been suggested a structure of a projection television in which two reinforcement plates 35 are provided at the both outer sides of the upper cabinet 5 and the lower cabinet 10, as shown in FIG. 3. By this structure, the problem associated with the appearance of the television is improved in some degrees.

However, for this structure, the upper cabinet 5 also should be bound to the lower cabinet 10 during the manufacturing process of the projection television and therefore, much manufacturing time is required. Further, additional cost for manufacturing the reinforcement plate is required.

SUMMARY OF THE INVENTION

Accordingly, the present invention has been made in an effort to solve the problems occurring in the prior art as described above, and an object of the present invention is to provide a structure of a projection television which can be readily assembled by a manufacturer while providing an aesthetic appearance for the projection television. Another object of the present invention is to provide a structure of a project television which is strong enough to vibrations applied from the outside so that an image on a screen is not affected when an upper cabinet is shaken by noises of a speaker or external impacts. Yet another object of the present invention is to provide a method for producing the structure of a projection television according to the present invention.

In order to accomplish the above objects, according to the present invention, there is provided a structure of a projection television comprises a supporting part provided with an image forming device; a screen upon which images are formed by lights projected from the image forming device; a front panel provided under the screen; an one-piece cabinet having an upper opening for the screen and an lower opening for the front panel; and upper and lower back covers provided at the rear of the one-piece cabinet.

Also, according to the present invention, there is provided a method for producing the projection television comprises steps of mounting components including a designated image forming device on a supporting part; fixing an one-piece cabinet in front of the supporting part; binding an upper back cover and lower back cover at the rear of the one-piece cabinet; and fixing a front panel having a control device of the projection television.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Reference will now be made in greater detail to preferred embodiments of the invention, an example of which is illustrated in the accompanying drawings.

Figure 4:
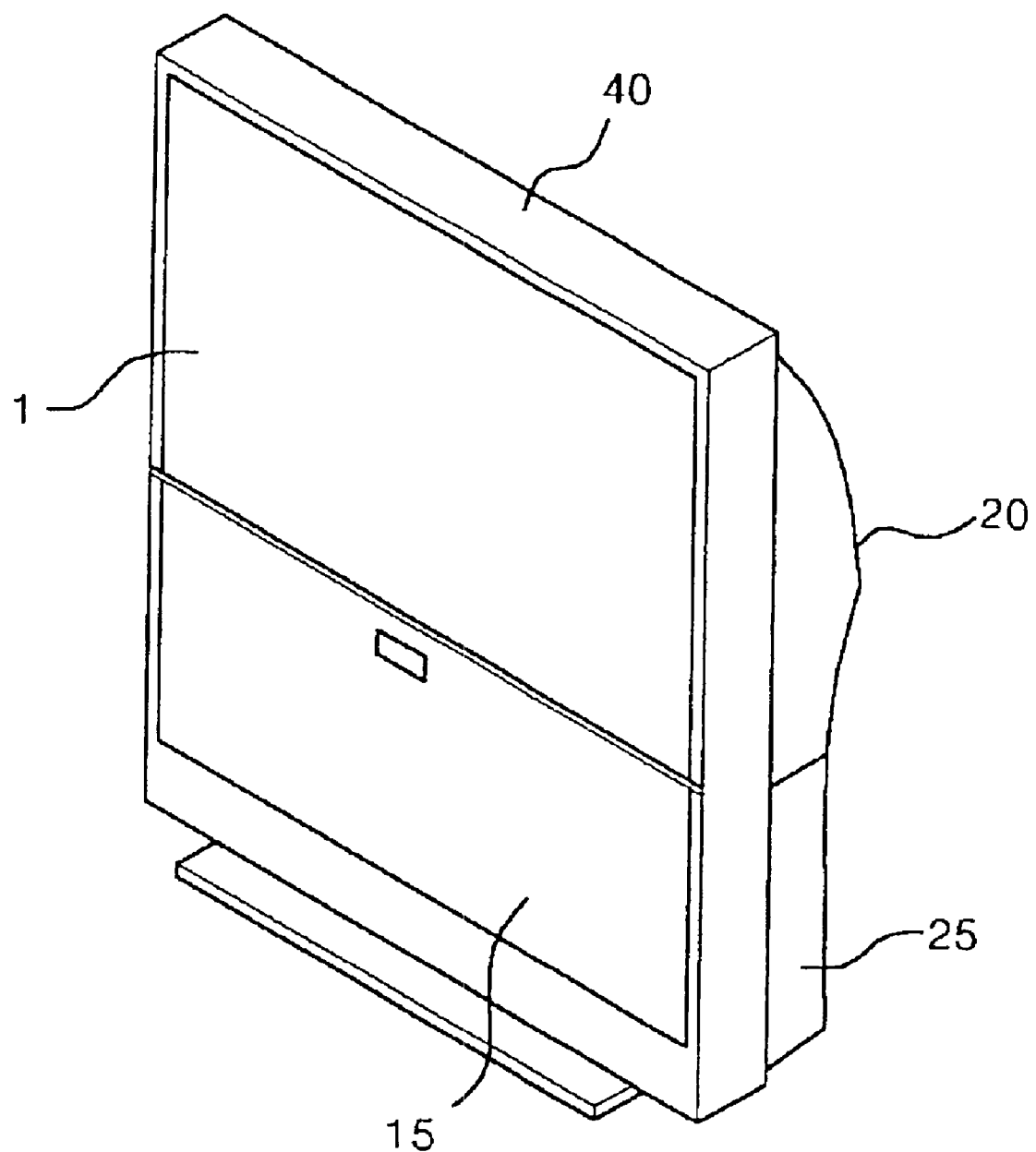
FIG. 4 is a perspective view of the projection television according to the present invention.

FIG. 4 is a perspective view of the projection television according to the present invention.

Referring to FIG. 4, the structure of the projection television comprises a screen 1 upon which lights projected from a projector form an image, a front panel 15 disposed under the screen 1 and provided with a designated image control device, an one-piece cabinet 40 disposed outside the screen 1 to support the screen 1, a lower cabinet 10 formed on the circumference of the screen 1 and the front panel 15 to support the screen 1 and the front panel 15 in their respective predetermined places, an upper back cover 20 disposed at the rear part of the cabinet 40 to protect interior components, and a lower back cover 25 provided under the upper back cover 20 to protect interior components of the projection television.

Also, a supporting part for supporting a projector is further provided between the front panel 15 and the lower back cover 25.

In the lower back cover 25, a mirror of a given shape is provided to reflect lights projected from the projector in an appropriate direction toward the screen 1.

The circumferences of the screen 1 and the front panel 15 are fixed to the one-piece cabinet 40 by means of a designated supporting structure.

The one-piece cabinet 40 is formed in a one-piece body and injection molded in a single process to form a final one-piece article. Therefore, complex processes for manufacturing different molds having various size required according to the size or model of the conventional product can be performed in a simple manner.

Particularly, since the one-piece cabinet 40 is molded in a single article, working efficiencies of workers are raised and moreover, the appearance of the projection television is improved.

Figure 5:
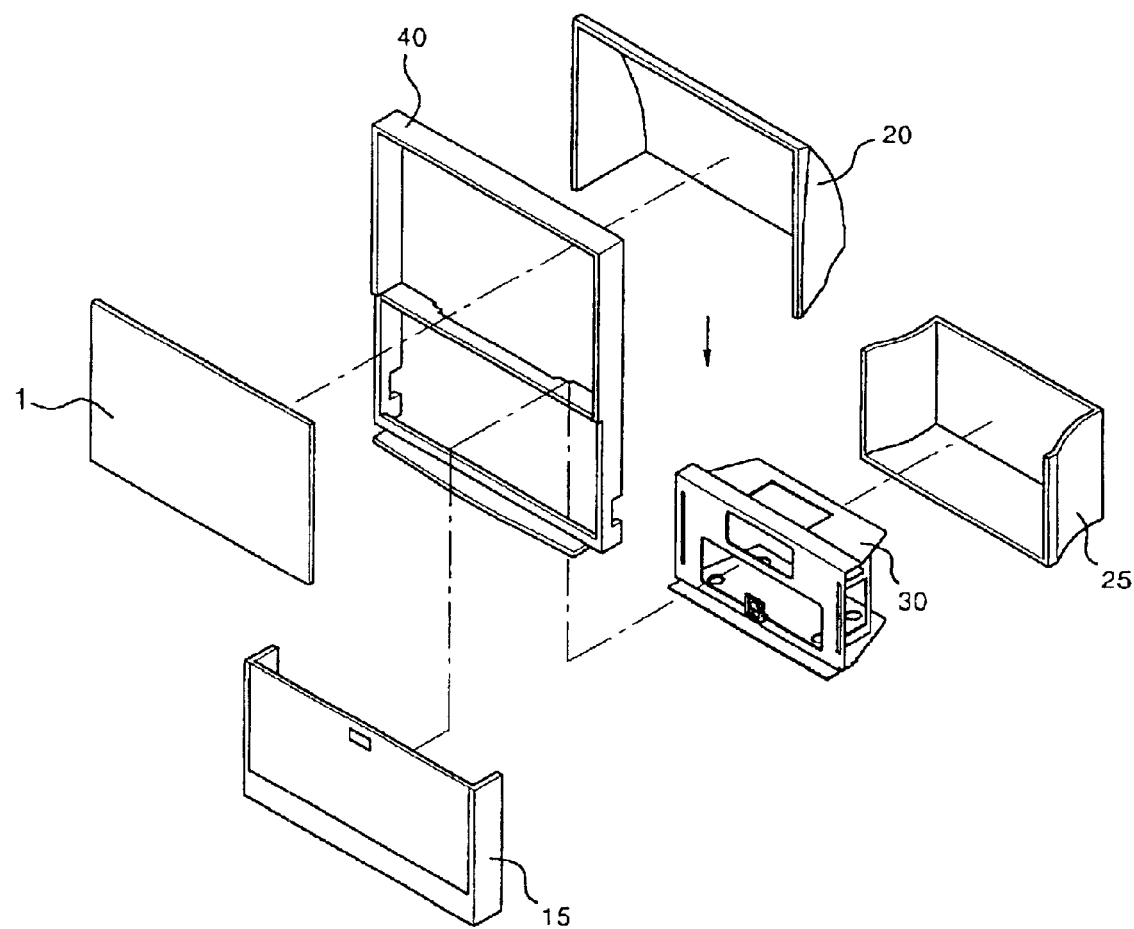
FIG. 5 is an exploded perspective view for schematically explaining the projection television according to the present invention.

FIG. 5 is an exploded perspective view for schematically explaining the projection television according to the present invention.

Referring to FIG. 5, the projection television is shown to have a screen 1; a front panel 15; an one-piece cabinet 40 of which the inner circumference the screen 1 and the front panel 15 are fixed to; an upper back cover 20 and a lower back cover 25 disposed at the rear part of the cabinet 40 to protect interior components; and a supporting part having an image forming device such as a projector and a plurality of circuit boards installed.

Particularly, the one-piece cabinet 40 is formed in a one-piece article, unlike the conventional two-piece type composed of an upper part and a lower part which are separately formed. Therefore, the projection television may have improved appearance and be assembled firmly against external vibrations.

In an embodiment to fix the screen 1 to the one-piece cabinet 40, the screen 1 may be directly bound to the one-piece cabinet 40 by means of a designated binding structure.

In another embodiment to fix the screen 1 to the one-piece cabinet 40, the screen 1 may be more perfectly bound to the one-piece cabinet 40 by a designated screen frame 70 (FIG. 10) disposed between the screen 1 and the one-piece cabinet 40.

To speak in detail, the screen frame 70 (FIG. 10) is formed as a separate article and the screen 1 is fixed to the screen frame, which in turn is fixed to the one-piece cabinet 40. Alternatively, the screen 1 may be fixed to the screen frame which has been previously fixed to the one-piece cabinet 40.

The screen 1 and the front panel 15 are fixed to the one-piece cabinet 40 by means of screw binding or an engaging protrusion.

Now, the binding structure of the screen and the one-piece cabinet in the projection television according to the present invention is described in detail.

Figure 6:
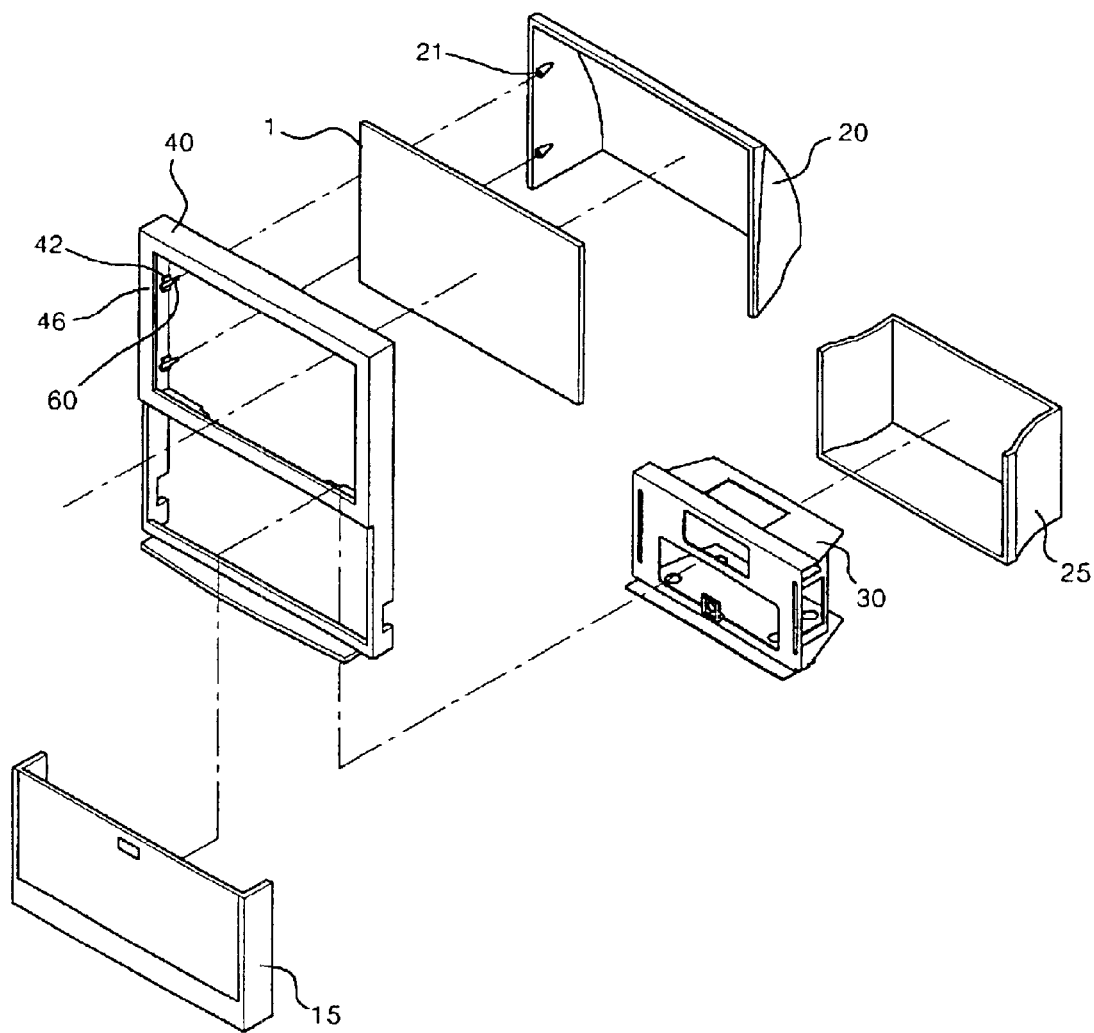
FIG. 6 is a view to explain the binding structure to directly fix the screen to the one-piece cabinet according to one embodiment of the present invention.

FIG. 6 is a view showing the binding structure to fix the screen directly to the one-piece cabinet according to one embodiment of the present invention.

Referring to FIG. 6, in addition to the components described for the television shown in FIG. 5, screen supporting surfaces 46 to support the screen 1 is further provided in front of the one-piece cabinet 40. The screen 1 is fixed at the rear of the one-piece cabinet 40 in a fashion that the front surface of the screen faces the rear surface of the screen supporting surfaces 46.

Figure 7:
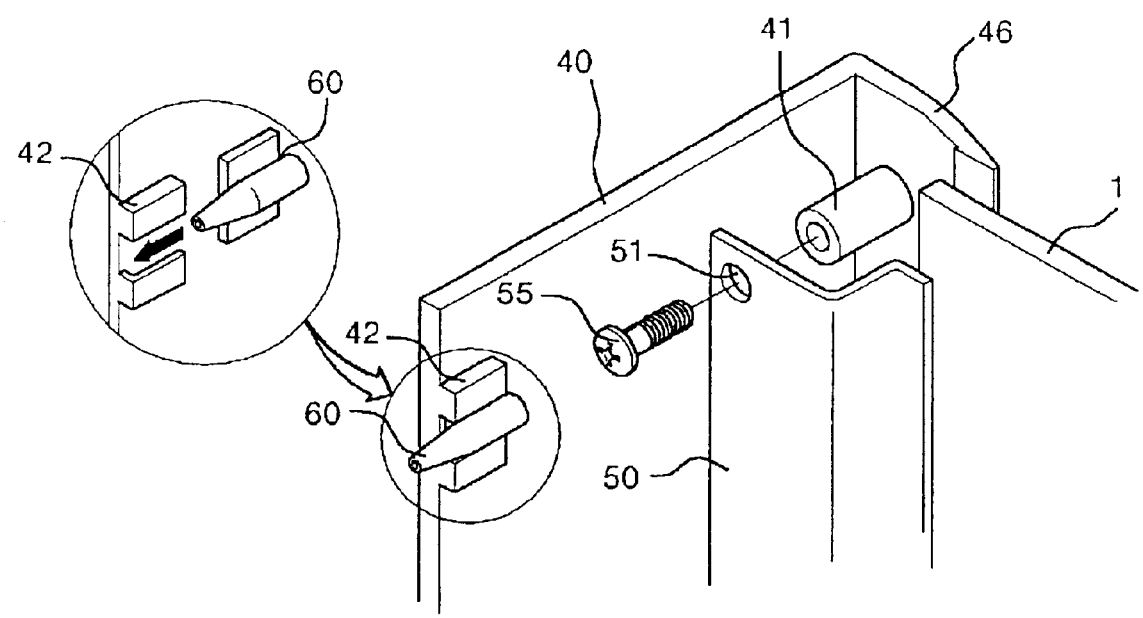
FIG. 7 is a view to explain the binding structure of the one-piece cabinet, screen and upper back cover according to one embodiment of the present invention.

FIG. 7 is a view showing the binding structure of the one-piece cabinet, screen and upper back cover according to one embodiment of the present invention.

Referring to FIG. 7, the one-piece cabinet 40 is provided with a guide boss 41 at the rear surface of the screen supporting surfaces to support the screen 1 and guide members 42 in which fixtures 60 are inserted, so as to fix the upper back cover (20, FIG. 6) to the one-piece cabinet 40.

Also, the one-piece cabinet 40 is provided screen supporting holders 50 which have a stepwise bent configuration, binding holes 51 formed on the screen supporting holders 50, and first fixtures 55 which are inserted in the guide boss 41 through the binding holes 51 to fix and support the screen 1 in a predetermined place.

The fixture 60 is inserted in the guide member 42 and formed to have a binding hole.

An adhesive may be applied on the lower surface of the fixture 60 and the contact surface of the guide member 42 to strongly bind the fixture to the guide member so that the fixture is stably secured without changing position.

Figure 8:
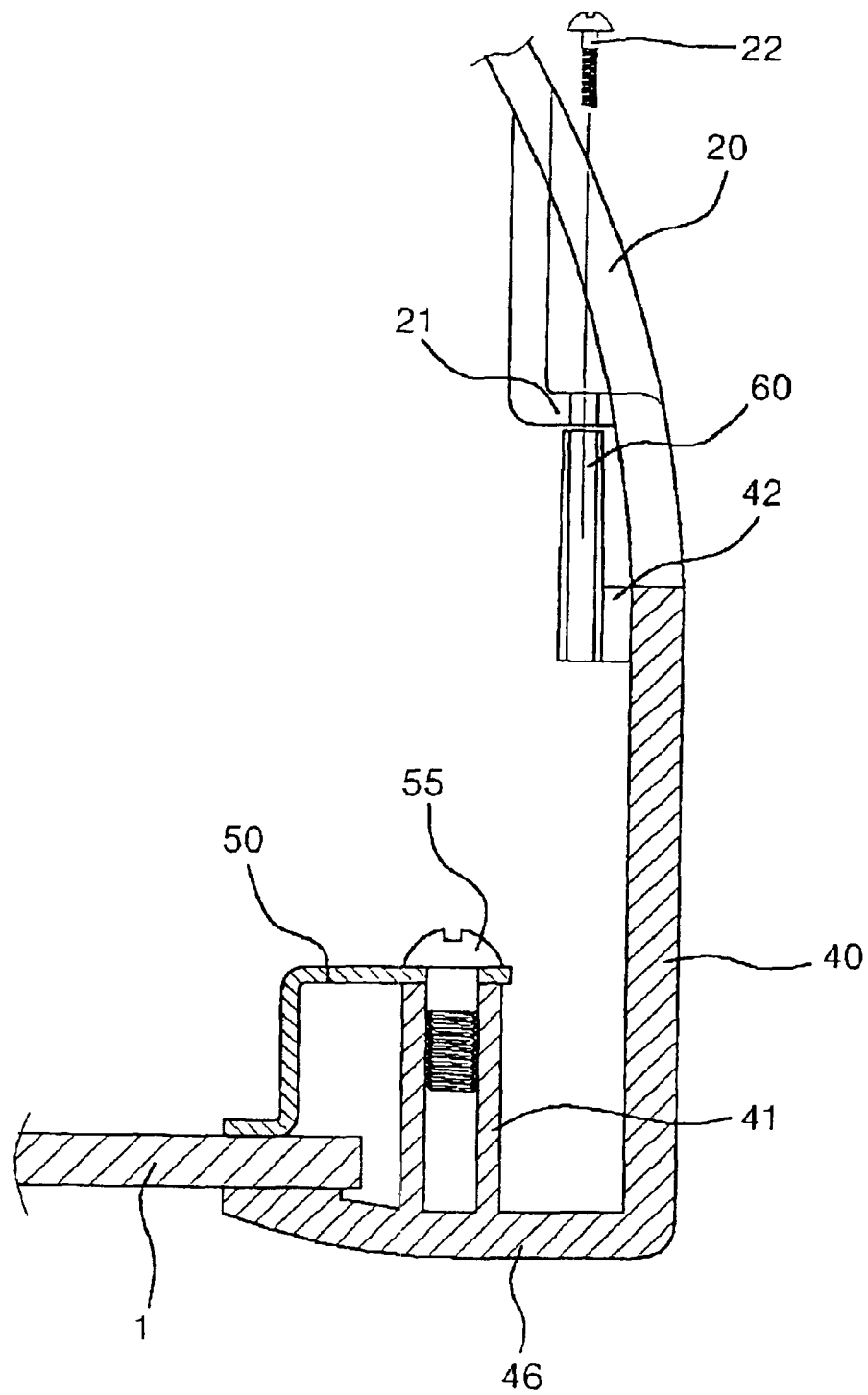
FIG. 8 is a cross-sectional view of the binding structure of the one-piece cabinet, screen and upper back cover according to one embodiment of the present invention.

FIG. 8 is a cross-sectional view of the fixing structure of the one-piece cabinet, screen and upper back cover according to one embodiment of the present invention.

Referring to FIG. 8, the screen 1 is disposed and fixed between the rear surface of the screen supporting surface 46 and the lower surface of an end of the screen supporting holder 50. The fixture 60 is inserted and tightened up in the guide boss 41 through the other end of the screen supporting holder 50 aligned with the guide boss 41 to fix the screen in a more stable manner.

Particularly, restitution force occurring in the bent surfaces of the screen supporting holder 50 against the deformation caused by being tightened of the first fixture 55 allows for the screen 1 to be firmly fixed.

The fixture 60 is aligned with a groove 21 formed in the circumference surface of the upper back cover 20 and a second fixture 22 is inserted in the groove and the fixture 60 to fix the one-piece cabinet 40 to the upper back cover 20.

Figure 9:
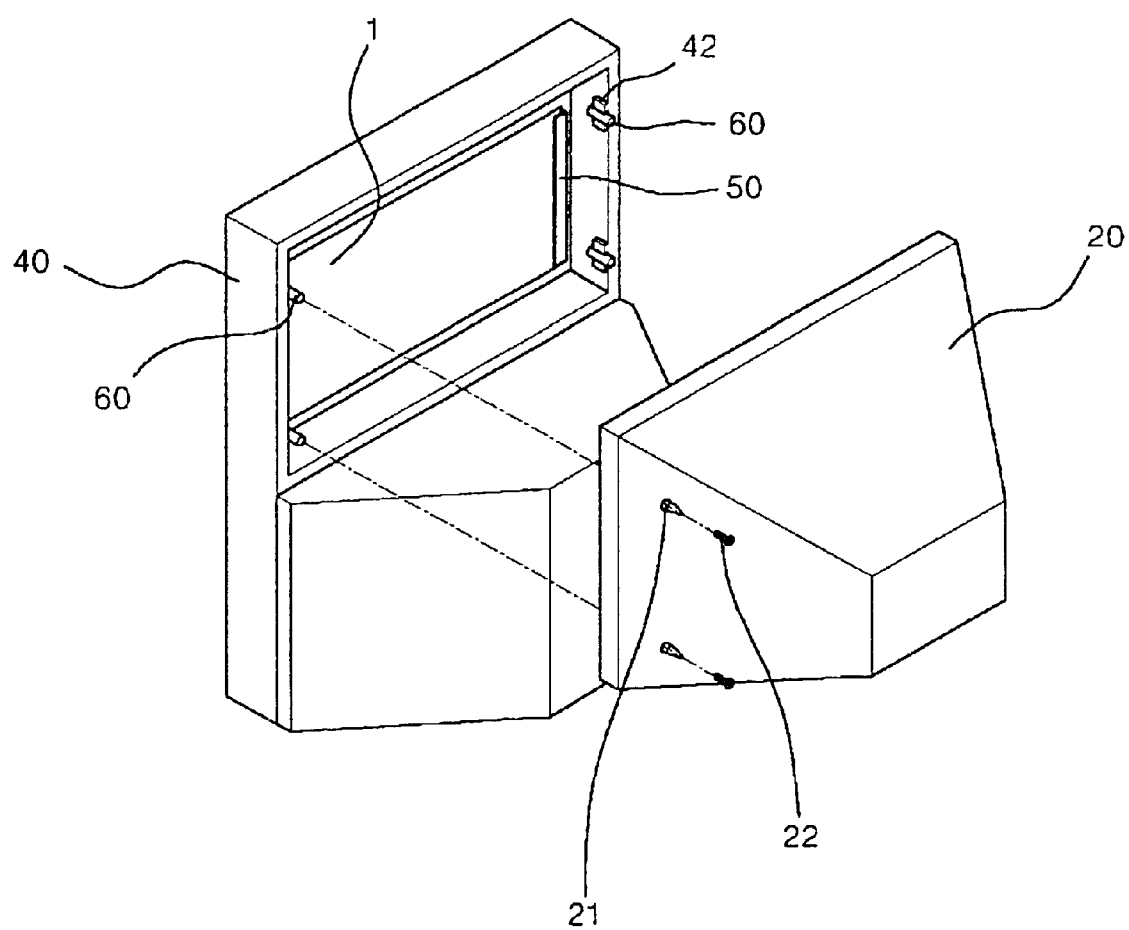
FIG. 9 is a perspective view to explain the binding of the one-piece cabinet, screen and upper back cover according to one embodiment of the present invention.

FIG. 9 is a perspective view showing the fixing of the one-piece cabinet, screen and upper back cover according to one embodiment of the present invention.

Referring to FIG. 9, a fixture 60 is aligned with a groove 21 formed in the circumference surface of an upper back cover 20 and a second fixture 22 is inserted in the groove and the fixture 60 to fix the one-piece cabinet 40 to the upper back cover 20.

Preferably, at least two fixtures 60, guide members 42 and grooves 21 are provided at both right and left sides, respectively to support the screen and fix the screen, the one-piece cabinet and the upper back cover.

Also, screen supporting holders 50 to support a screen 1 are provided inside of an one-piece cabinet 40.

Figure 10:
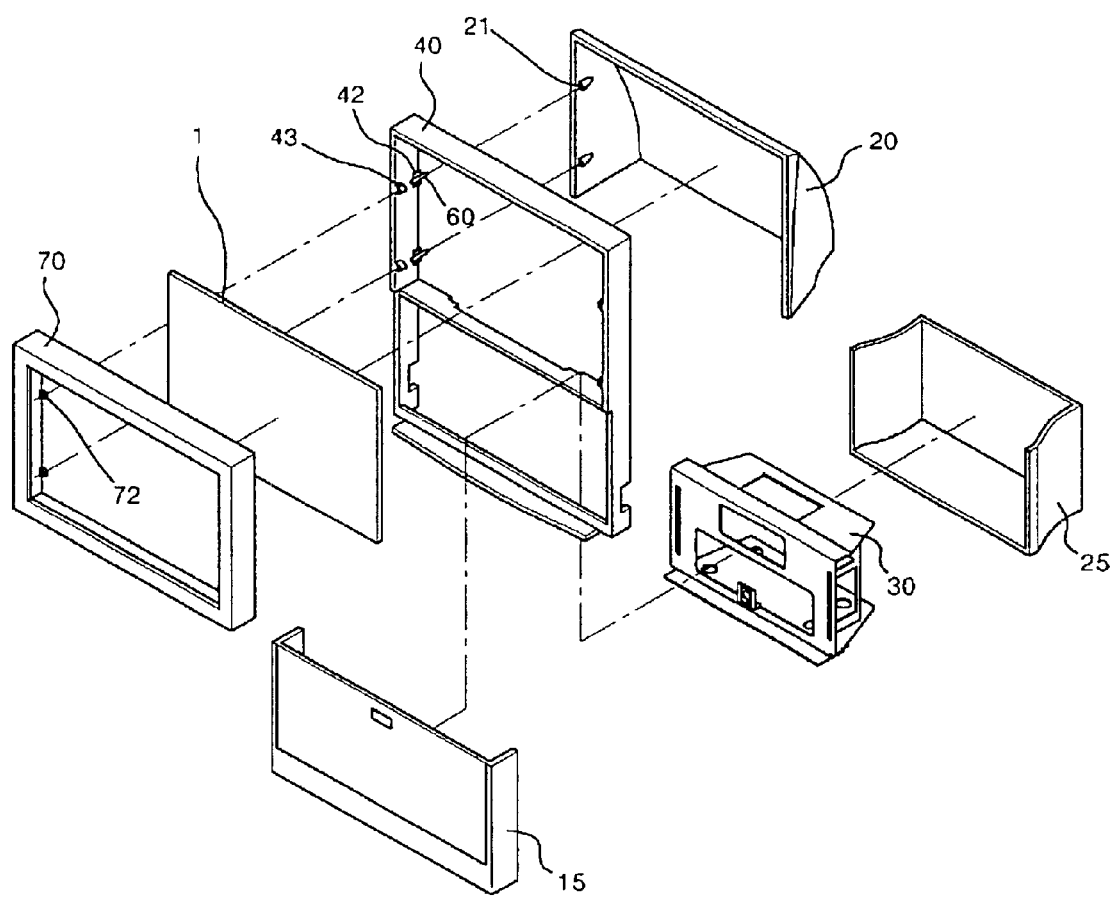
FIG. 10 is a view to explain a structure of a projection television further comprising a screen frame to which a screen is fixed according to another embodiment of the present invention.

FIG. 10 is a view showing a structure of a projection television further comprising a screen frame to which a screen is fixed according to another embodiment of the present invention.

Referring to FIG. 10, a front panel 15, an upper back cover 20, a supporting part 30 and a lower back cover 25 are the same as for the first embodiment according to the present invention but a screen 1, a screen frame 70 and an one-piece cabinet 40 are different from the first embodiment.

Now, the structure of the screen 1, screen frame 70 and one-piece cabinet 40 will be described in detail.

The screen frame 70 to which the screen 1 is fixed is provided in front of the screen 1. The screen frame 70 is also fixed to the one-piece cabinet 40 to secure the screen in a place.

Figure 11:
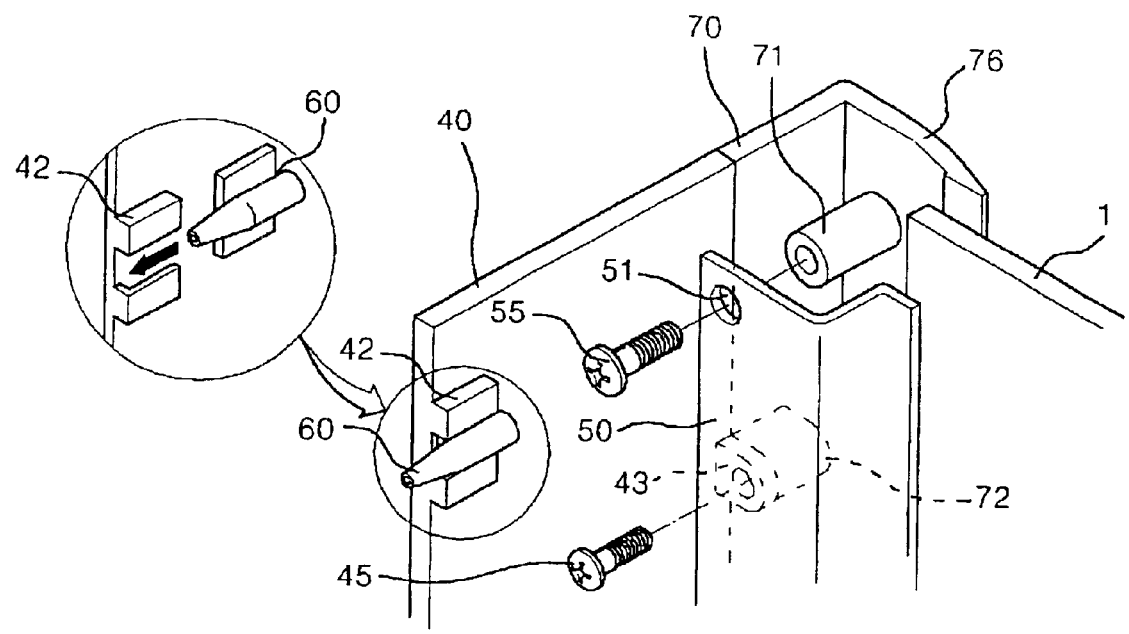
FIG. 11 is a view to explain the binding of the screen, screen frame and one-piece cabinet according to another embodiment of the present invention.

FIG. 11 is a view to explain the fixing of the screen, screen frame and one-piece cabinet according to another embodiment of the present invention.

Referring to FIG. 11, the screen frame 70 have a screen supporting surface 76 extending from an end of the screen frame 70 toward the inside so that the screen is supported thereon, a guide boss 71 vertically protruding from the inside of the screen supporting surface 76 and a first frame fixture 72 provided at the other end of the screen frame 70 to fix the screen frame.

Also, in addition to the above-described guide member 42 and fixture 60, the one-piece cabinet 40 includes a second frame fixture 43 which is aligned with the first frame fixture 72 to fix the screen frame 70.

Figure 12:
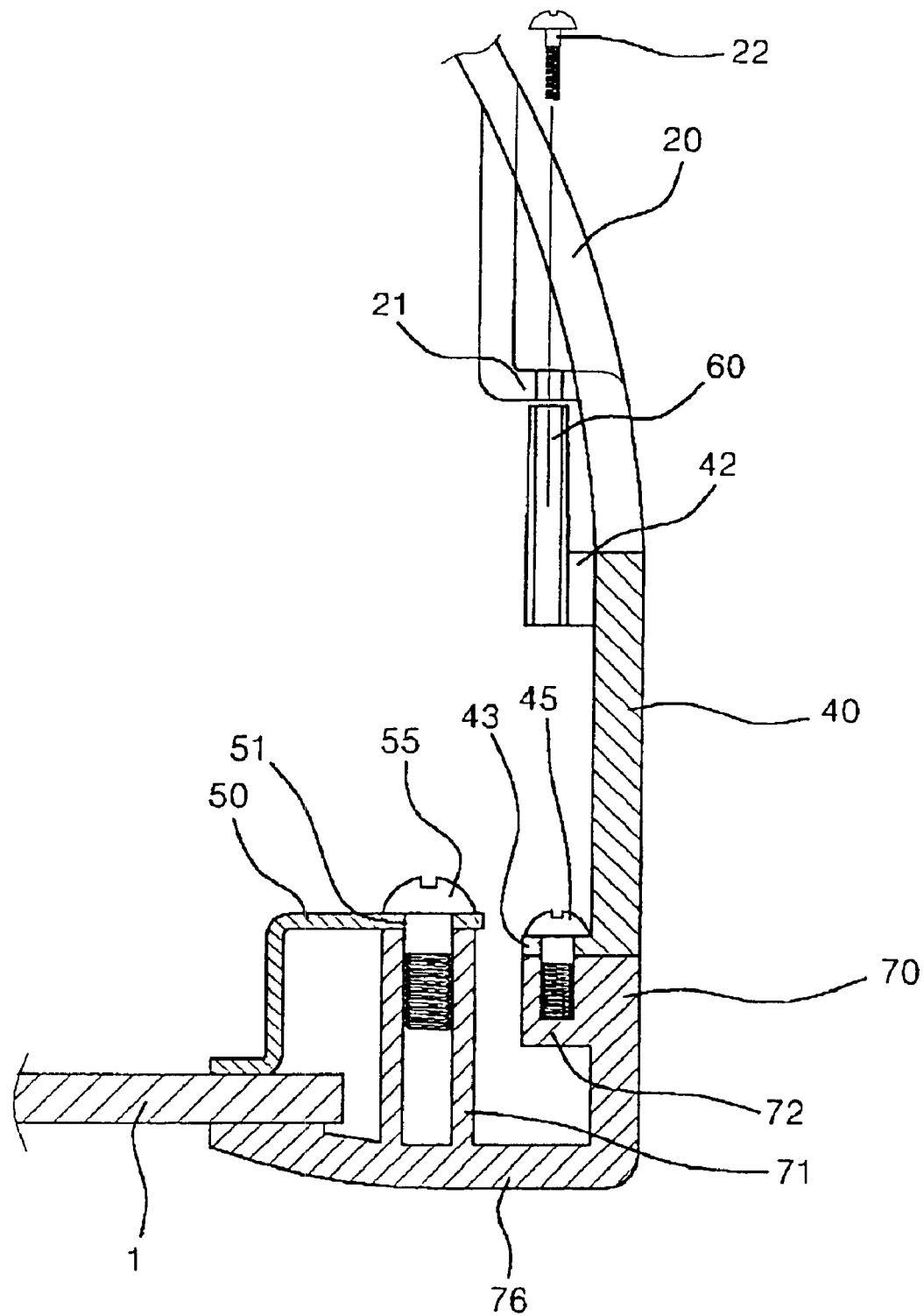
FIG. 12 is a cross-sectional view of the binding structure of the screen, screen frame, one-piece cabinet and the upper back cover according to another embodiment of the present invention.

FIG. 12 is a cross-sectional view of the fixing structure of the screen, screen frame, one-piece cabinet and the upper back cover according to another embodiment of the present invention.

Referring to FIG. 12, the screen 1 is disposed and fixed between the rear surface of the screen supporting surface 76 and the lower surface of the first step of the screen supporting holder 50. The first fixture 55 is inserted and tightened up in the guide boss 71 through the hole at the other step of the screen supporting holder 50 aligned with the guide boss 71 to secure the screen holder 50 in a more stable manner, thereby fixing the screen 1 in a fixed place.

The first frame fixture 72 formed at one end of the screen frame 70 is aligned with a second frame fixture 43 formed at one end of the one-piece cabinet 40 and a third fixture 45 is inserted and tightened up in the aligned first frame fixture 72 and second frame fixture 43 to fix the screen frame 70 to the one-piece cabinet 40.

A second fixture 22 is inserted and tighten up in a fixture 60 secured in a guide member 42 through an inserting groove 21 aligned with the fixture 60 to fix the upper back cover 20 to the one-piece cabinet 40.

Figure 13:
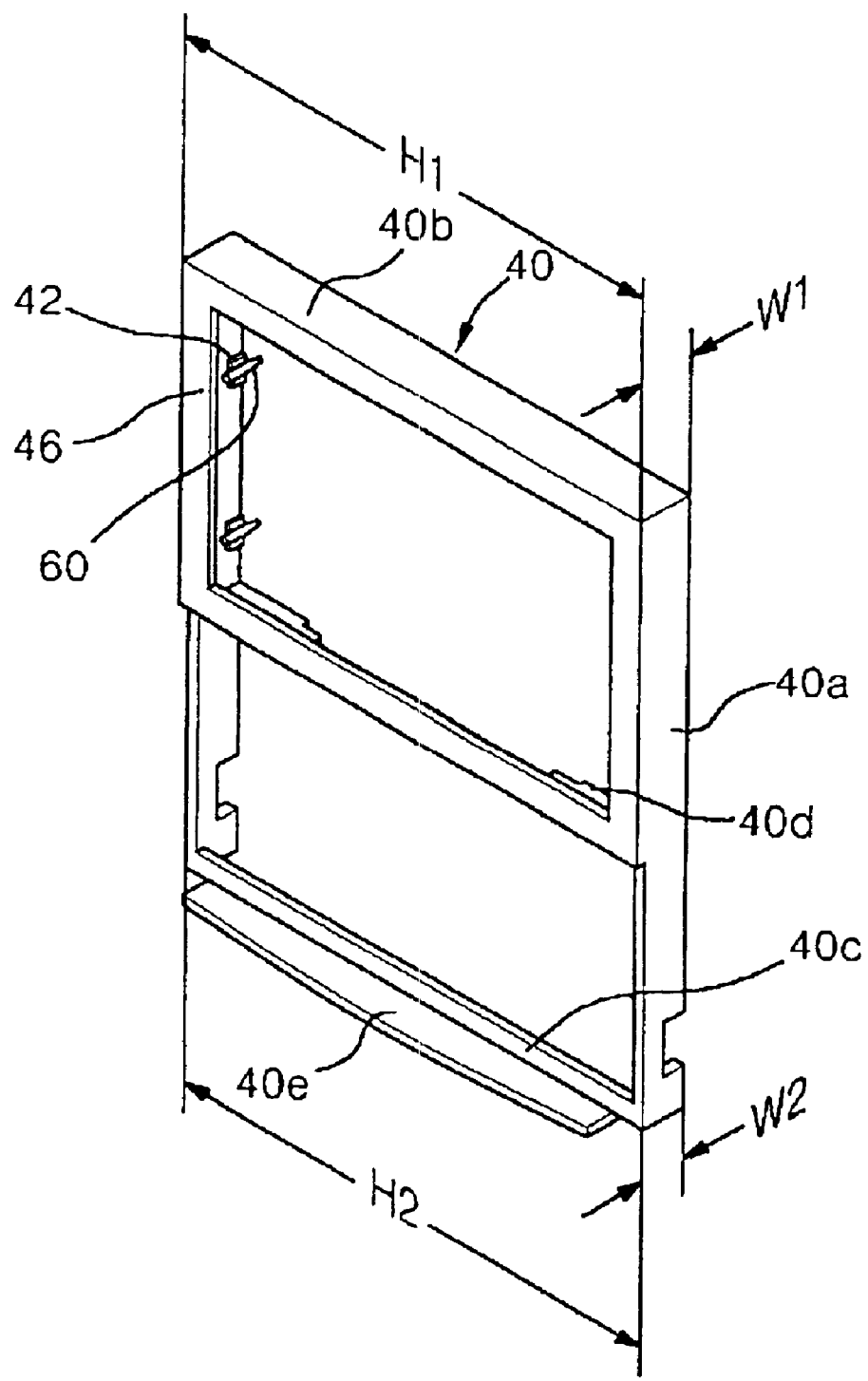
FIG. 13 is a perspective view of the one-piece cabinet according to one embodiment of the present invention.

FIG. 13 is a perspective view of the one-piece cabinet according to one embodiment of the present invention.

Referring to FIG. 13, the one-piece cabinet to which a screen 1 is directly fixed has vertical frames 40a at both side ends, an upper horizontal frame 40b formed at the top of the vertical frames 40a, to which the screen 1 and the upper back cover 20 are fixed, an lower horizontal frame 40c formed at the bottom of the vertical frames 40a, to which the front panel 15 is fixed, screen supporting zone 40d formed at the approximately middle of the vertical frames 40a and extending horizontally, to which the screen 1 is fixed, and screen supporting surfaces 46 having an inner surfaces by which the bottom of the screen is supported.

The lower horizontal frame 40c may further comprise a rug 40e to protect the lower part of the projection television, which is formed with the lower horizontal frame 40c while extending along the entire length of the bottom of the projection television so that the manufacturing process can be preferably simplified.

The vertical frames 40a are provided at their inner side surface with guide members 42 and fixtures 60 to fix the upper back cover 20 to the one-piece cabinet 40.

Explaining in detail the shape of the one-piece cabinet 40, when the side width W2 of the vertical frame where the front panel 15 is provided is the same as the side width W1 of the vertical frame where the screen 1 is provided, the vertical frame 40a is formed to have an equal side width along the entire length of the zone, thereby providing a aesthetic appearance. However, when the side width of the front panel 15 is great, the side width W2 of the one-piece cabinet at the region where the front panel 15 is provided is formed to become smaller than the side width W1 of the one-piece cabinet at the region where the screen 1 is provided, thereby give a change to the entire shape of the projection television.

Such change of the entire shape of the one-piece cabinet 40 is also applied to the width of the front panel 15 and the screen 1.

In other words, when the width of the front panel 15 is smaller than the width of the screen 1, the upper part of the one-piece cabinet 40 where the screen 1 is attached may be designed to have a width H1 which is greater than a width H2 of the lower part of the one-piece cabinet 40 where the front panel 15 is attached.

Thus, the one-piece cabinet 40 may have a stand formed at osculating region of between the side widths W1, W2 and between the width H1, H2 on the screen supporting zone 40d.

Figure 14:
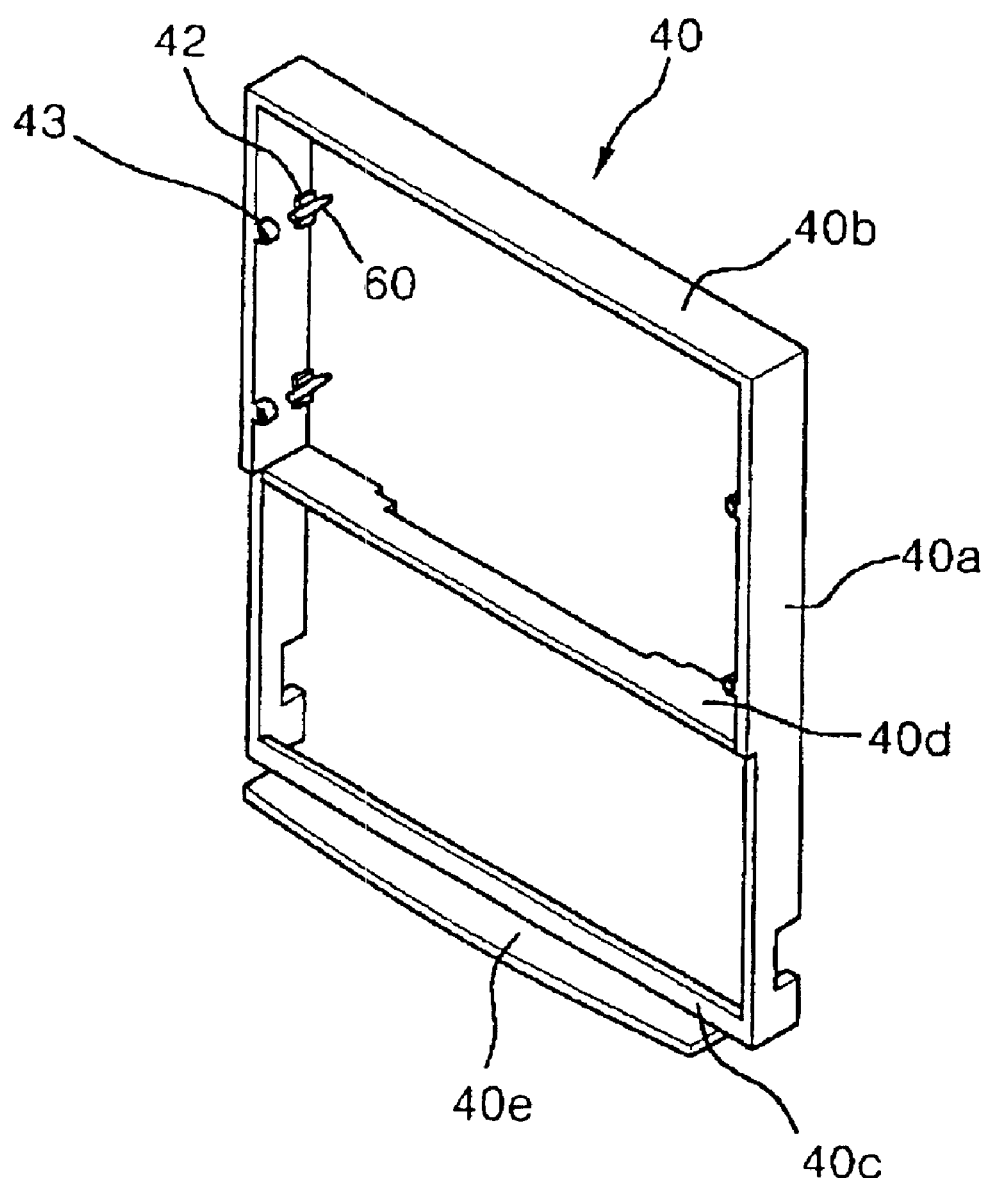
FIG. 14 is a perspective view of the one-piece cabinet according to another embodiment of the present invention.

FIG. 14 is a perspective view of the one-piece cabinet according to another embodiment of the present invention.

Referring to FIG. 14, there is shown a one-piece cabinet 40 in a case when a separate screen frame 70 for fixing a screen is provided and fixed to the one-piece cabinet 40.

Figure 1:
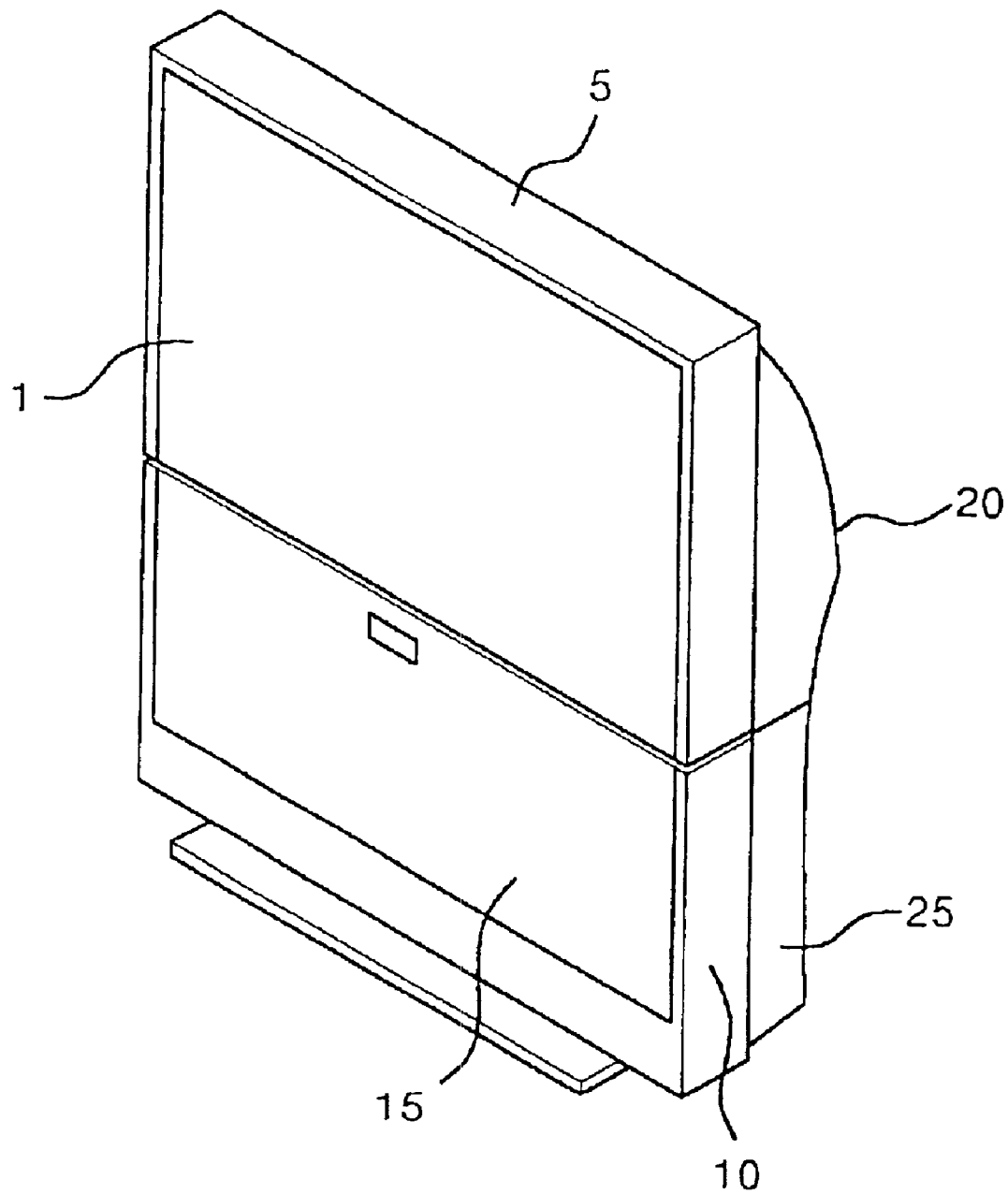
FIG. 1 is a perspective view of the conventional projection television.

In detail, the concrete constructions are the same as the construction of the embodiment shown in FIG. 13, except that a screen supporting surface (reference number 46 in FIG. 13) to support a screen 1 is not provided. In stead, the one-piece cabinet is provided with second frame fixtures 43 to fix a screen frame (reference number 70 in FIG. 1) and guide members 42 and fixtures 60 to fix the upper back cover 20.

From a different angle of view, according to the present invention, it is possible to reduce a complex process for manufacturing a projection television by forming a one-piece cabinet having an upper opening on which a screen 1 is mounted and a lower opening where a front panel is provided, as a single article.

A method for manufacturing a projection television according to the present invention is sequentially described referring to the construction described above.

Firstly, a designated image forming device such as a projector and a plurality of circuit boards needed for operation of the image forming device are mounted on the supporting part 30.

In front of the supporting part 30, the one-piece cabinet 40 which has the screen 1 supported by the supporting holders 50 is fixed.

Figure 2:
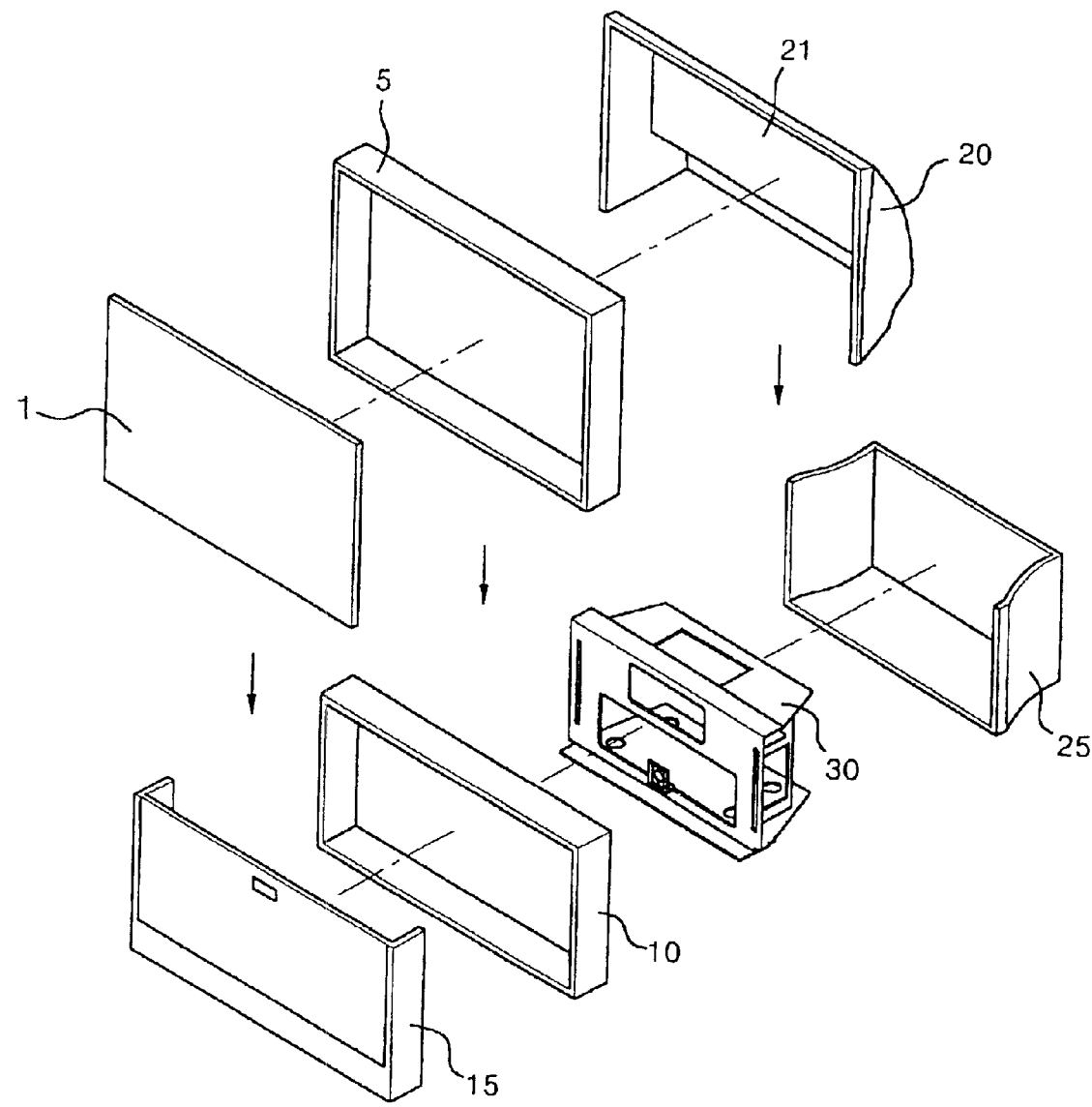
FIG. 2 is an exploded perspective view of the conventional projection television.
Figure 3:
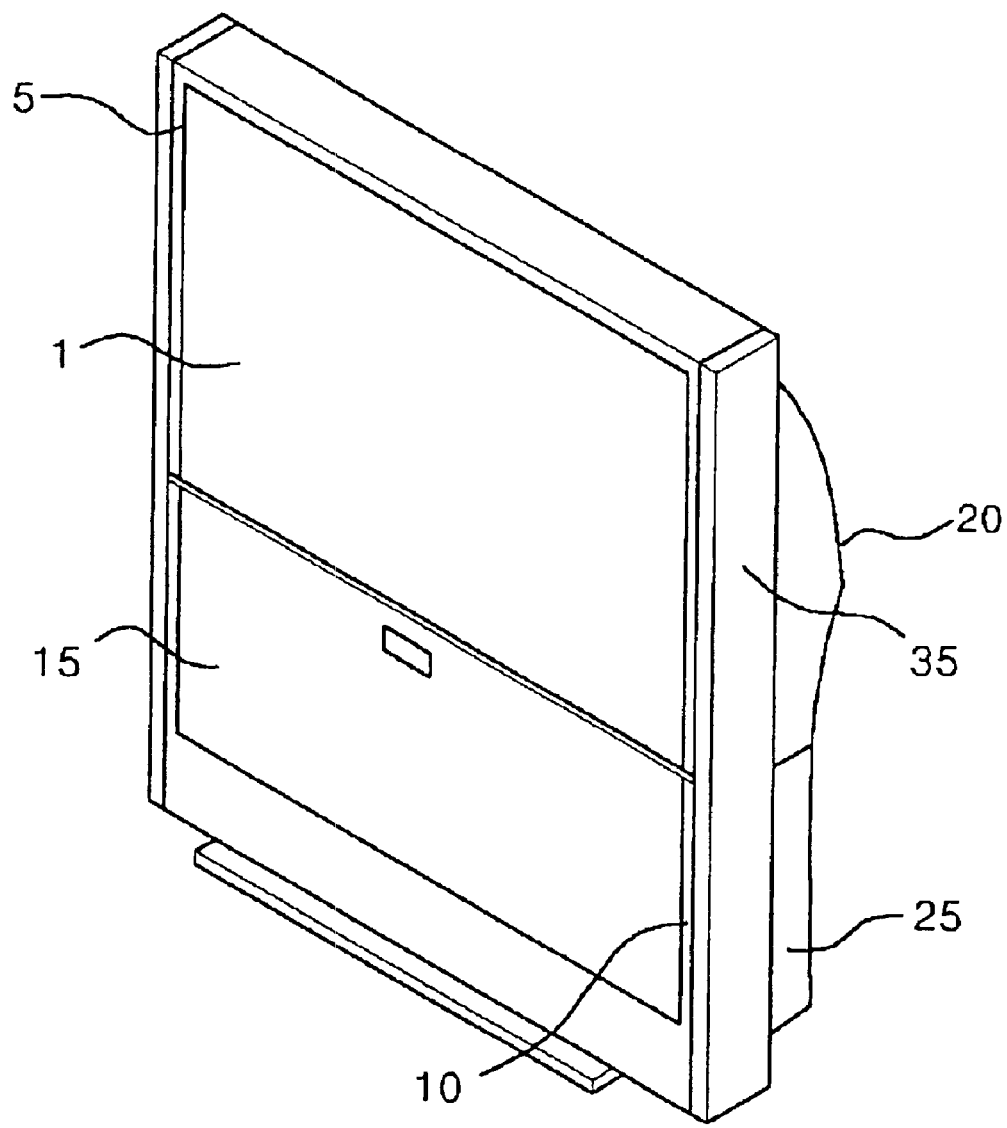
FIG. 3 is a perspective view of another conventional projection television.

In the projection television according to the present invention, it is possible to achieve the effect as if the upper cabinet (5 in FIG. 2) and the lower cabinet (10 in FIG. 2) are bonded to other components of the projection television at once, unlike the conventional projection television wherein the upper cabinet and the lower cabinet are separately bonded to other components of the projection television. Further, since the upper cabinet and the lower cabinet is formed into a one-piece cabinet as a single article, there is not needed a process for binding the upper cabinet and the lower cabinet.

Then, the upper back cover 20 and the lower back cover 15 are fixed to the one-piece cabinet 40 to protect the rear of the projection television.

After fixation of the upper back cover 20 and the lower back cover 15, the front panel 15 is fixed to complete a series of processes for manufacturing a projection television.

As mentioned above, according to the present invention, it is possible to fix a one piece cabinet to a supporting part without needing a separate process to bind a upper cabinet with a lower cabinet, thereby making the method for manufacturing a projection television simple and convenient.

Thus, by the structure of the projection television according to the present invention, it is possible to simplify the process for manufacturing the projection television and reduce the cycle time of the process. Also, advantageously, the structure of the projection television is not shaken by any external vibration.

Further, by the structure of the projection television according to the present invention, it is possible to make a projection television with an improved appearance.

In addition, by the structure of the projection television according to the present invention, it is possible to reduce the number of the components needed for construction of the projection television, thereby reducing the manufacturing cost.

By the method for manufacturing a projection television according to the present invention, it is possible to manufacture a projection television in a simple manner.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A structure of a projection television comprising:
    a supporting part provided with an image forming device;
    a screen upon which images are formed by lights projected from the image forming device;
    a front panel provided under the screen;
    a one-piece cabinet component having an upper opening and a lower opening separate from the upper opening, the upper opening corresponding to an area for the screen and the lower opening corresponding to an area for the front panel, the one-piece cabinet component comprising at least two side frame members, a top frame member and a bottom frame member; and
    upper and lower back covers provided at the rear of the one-piece cabinet component.

2. The structure of the projection television according to claim 1, wherein the one-piece cabinet component includes a screen supporting zone to support a bottom of the screen.

3. The structure of the projection television according to claim 1, wherein the one-piece cabinet component is provided with a rug which is formed at a bottom of the cabinet component to protect the lower part of the projection television.

4. A structure of a projection television comprising:

a supporting part provided with an image forming device;

a screen upon which images are formed by lights projected from the image forming device;

a front panel provided under the screen;

a one-piece cabinet component having a screen supporting surface extending toward an inside of the one-piece cabinet component so that the screen is coupled thereto and a plurality of guide bosses protruding from the inside of the screen supporting surface;

screen supporting holders having one step provided with binding holes to be aligned with the guide bosses and another step which the screen is fixed to and supported by;

first fixtures to be inserted in the guide bosses through the binding holes to fix and support the screen; and upper and lower back covers provided at the rear of the one-piece cabinet component.

5. The structure of a projection television according to claim 4, wherein each of the screen supporting holders have a stepwise bent configuration.

6. The structure of a projection television according to claim 4, further comprising:

inserting grooves formed at the upper back cover;

fixtures aligned with the insertion grooves, and guide members formed at the inner surface of the one-piece cabinet component to fix the fixture.

7. The structure of the projection television according to claim 4, wherein the screen supporting holders are provided at the screen supporting surfaces of the both sides.

8. A structure of a projection television comprising:

a supporting part provided with an image forming device;

a screen upon which images are formed by lights projected from the image forming device;

a front panel provided under the screen;

a screen frame having a screen supporting surface extending toward an inside of the screen frame so that the screen is coupled thereto and a plurality of guide bosses protruding from the inside of the screen supporting surface;

screen supporting holders having one step provided with binding holes to be aligned with the guide bosses and another step which the screen is fixed to and supported by;

first fixtures to be inserted in the guide bosses through the binding holes to fix and support the screen;

a one-piece cabinet member having an upper opening and a lower opening separate from the upper opening, the upper opening corresponding to an area where the screen frame is fixed and the lower opening corresponding to an area where the front panel is fixed; and upper and lower back covers provided at the rear of the one-piece cabinet member.

9. The structure of the projection television according to claim 8, further comprising:

first frame fixtures provided at an end of the screen frame;

second frame fixtures provided at an end of the screen frame and aligned with the first frame fixtures; and third fixtures to be inserted and tightened up in the aligned first frame fixtures and second frame fixtures to fix the screen frame to the one-piece cabinet member.

10. The structure of the projection television according to claim 8, wherein each of the screen supporting holders have a stepwise bent configuration.

11. The structure of the projection television according to claim 8, wherein the screen supporting holders are provided at the screen supporting surfaces of the both sides.

12. A structure of a projection television comprising:

a screen upon which images are formed;

a front panel provided under the screen;

a one-piece cabinet member having an upper opening corresponding to an area of the screen and an lower opening corresponding to an area of the front panel; and upper and lower back covers provided at the rear of the one-piece cabinet member, so as to be conveniently manufactured.

13. The structure of the projection television according to claim 12, wherein the one-piece cabinet member has two vertical frame members, at both sides of the one-piece cabinet member.

14. The structure of the projection television according to claim 13, wherein the one-piece cabinet member further has a horizontal frame member connecting the two vertical frame members at an area to distinguish the upper opening from the lower opening.

15. The structure of the projection television according to claim 1, wherein the one-piece cabinet component comprises at least a screen supporting frame member.

* * * * *